(12) United States Patent
Yang et al.

(10) Patent No.: US 11,135,498 B2
(45) Date of Patent: Oct. 5, 2021

(54) SYSTEM FOR ANALYZING PUTTING MOTION

(71) Applicant: Invant Inc., Suwon-si (KR)

(72) Inventors: Jin Hyuk Yang, Seongnam-si (KR); Chang Hwan Shon, Seongnam-si (KR); Ho Sik Kim, Seongnam-si (KR); Hong Jun Yun, Seongnam-si (KR); Wan Soo Shin, Seongnam-si (KR); Il Bum Jung, Seongnam-si (KR)

( * ) Notice: Subject to any disclaimer, the term of this patent is extended or adjusted under 35 U.S.C. 154(b) by 0 days.

(21) Appl. No.: 16/255,864

(22) Filed: Jan. 24, 2019

(65) Prior Publication Data

US 2021/0001200 A1    Jan. 7, 2021

(30) Foreign Application Priority Data

Feb. 7, 2018   (KR) .................... 10-2018-0015210

(51) Int. Cl.

| | |
|---|---|
| *A63B 69/36* | (2006.01) |
| *A63B 43/00* | (2006.01) |
| *A63B 102/32* | (2015.01) |

(52) U.S. Cl.
CPC ........ *A63B 69/3661* (2013.01); *A63B 43/008* (2013.01); *A63B 69/3617* (2013.01);
(Continued)

(58) Field of Classification Search
CPC ............. A63B 69/3661; A63B 43/008; A63B 69/3617; A63B 2102/32; A63B 2220/10;
(Continued)

(56) References Cited

U.S. PATENT DOCUMENTS

2002/0155896 A1* 10/2002 Gobush ............. A63B 69/3658
  473/197
2006/0040761 A1    2/2006 Shin
(Continued)

FOREIGN PATENT DOCUMENTS

CN    1677112 A    10/2005
CN    103185544 A    7/2013
(Continued)

OTHER PUBLICATIONS

CN2019100442828; Notice of Reason for Refusal; dated Sep. 5, 2020.
(Continued)

*Primary Examiner* — Eugene L Kim
*Assistant Examiner* — Rayshun K Peng
(74) *Attorney, Agent, or Firm* — Patshegen IP LLC; Moshe Pinchas (57) ABSTRACT

A system for analyzing a putting motion includes: mat markers attached to a mat on which a ball is placed; a putter marker attached to a putter for applying an impact to the ball; a mat having a color contrasting with colors of the mat markers, the putter marker and the ball; a camera for photographing the mat markers, the ball, and the putter marker; a mat detection unit for detecting a position of the mat from an image photographed by the camera; an object detection unit for detecting positions of the putter and the ball in real time; a ball calculation unit for calculating a speed and a moving direction of the ball based on the detected ball; and a pointer calculation unit for calculating a pointer position for a menu selection function necessary for a simulator operation by using coordinates of the detected putter.

7 Claims, 7 Drawing Sheets

(52) U.S. Cl.
CPC ....... *A63B 2102/32* (2015.10); *A63B 2220/10* (2013.01); *A63B 2220/20* (2013.01); *A63B 2220/30* (2013.01); *A63B 2220/807* (2013.01)

(58) Field of Classification Search
CPC ............ A63B 2220/20; A63B 2220/30; A63B 2220/807; A63F 13/214
USPC ........................................................ 473/278
See application file for complete search history.

(56) References Cited

U.S. PATENT DOCUMENTS

| | | | | |
|---|---|---|---|---|
| 2020/0013312 | A1* | 1/2020 | Pregizer | G09B 19/0038 |
| 2020/0038742 | A1* | 2/2020 | Van Wagoner | G09B 19/0038 |

FOREIGN PATENT DOCUMENTS

| | | |
|---|---|---|
| JP | 2013-535258 A | 9/2013 |
| JP | 2015-181770 A | 10/2015 |
| JP | 2017-113585 A | 6/2017 |
| KR | 2004-195240 A | 7/2004 |
| KR | 10-0489418 B1 | 5/2005 |
| KR | 10-2010-0022415 A | 3/2010 |
| KR | 2015-512660 A | 4/2015 |
| WO | 2006/062310 A1 | 6/2006 |
| WO | 2012011652 A2 | 1/2012 |

OTHER PUBLICATIONS

JP2019-015728; Notice of Reasons for Refusal.
KR10-2018-0015210; Notice of Reasons for Refusal; dated Jan. 18, 2019.
CN2019100442828; Search Report; dated Sep. 5, 2020.

\* cited by examiner

SYSTEM FOR ANALYZING PUTTING MOTION

BACKGROUND OF THE INVENTION

1. Field of the Invention

The present invention relates to a system for analyzing a putting motion, and more particularly, to a system for detecting positions and movements of a putting mat, a putter, and a ball in real time from an image inputted from a camera sensor.

2. Description of the Related Art

A putting stroke is considered as very important because the percentage of the putting strokes is in the range from 40% to 50% based on the overall strokes of a golf game. The putting stroke is the most difficult stroke for golfers among typical swings of golf.

For this reason, various studies have been carried out by kinetic, kinematic, and psychological schemes, or the like for a successful putting stroke, and various measurement systems have been developed to support the studies.

As a typical measurement system, an infrared three-dimensional motion analysis camera and a high-speed video camera, which use an optical scheme, have been a basis of the kinetic studies, and a force platform and an inertial measurement system, which are sensor-based electronic apparatuses, have been used for the kinetic and kinematic studies.

In addition, although there is a scheme for constructing a rectangular coordinate system and determining a position of the ball by placing a thin thread on an artificial putting mat, the above scheme is not easy to implement and the position of the ball has to be manually checked, so that the above scheme is inaccurate.

SUMMARY OF THE INVENTION

The present invention provides a system configured to analyze positions and speeds of a ball in real time by using a camera without using additional electronic equipment, and select a menu of a simulator without special equipment Through the system for analyzing the putting motion of the present invention, the moving direction and the speed of the ball are detected in real time, so that the performance of the simulator is improved, and the operation, such as a menu selection, of the simulator is performed by implementing a pointer function without special equipment.

DETAILED DESCRIPTION OF THE INVENTION

Figure 1:
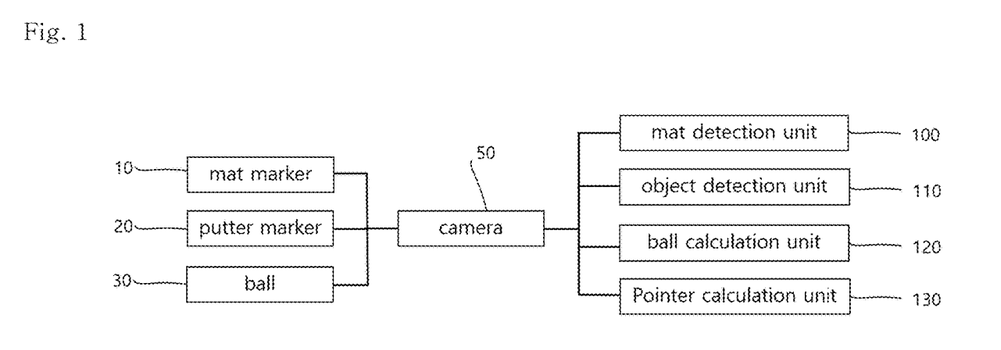
FIG. 1 is a block diagram showing the configuration of a system for analyzing a putting motion according to the present invention.
Figure 2A:
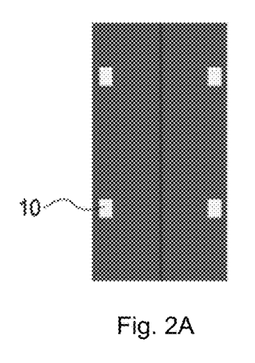
FIGS. 2A-2D are examples of arranging mat markers on a mat according to an embodiment of the present invention.
Figure 2B:
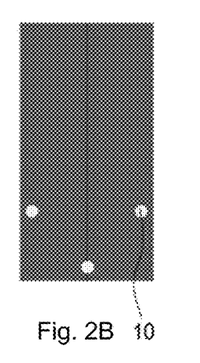
Figure 2C:
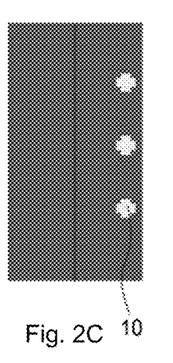
Figure 2D:
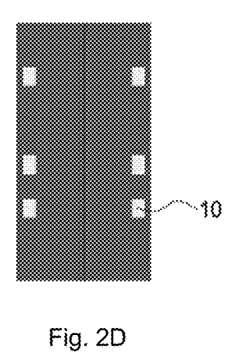
Figure 3A:
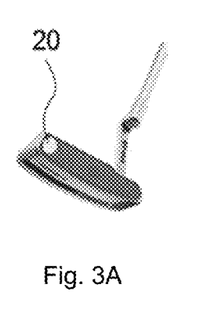
FIGS. 3A-3D are various cases that a putter marker is attached to a putter according to an embodiment of the present invention.
Figure 3B:
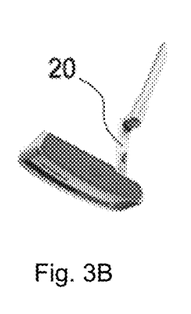
Figure 3C:
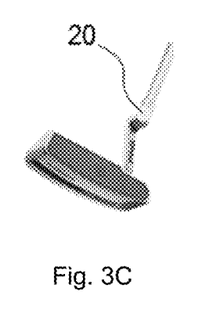
Figure 3D:
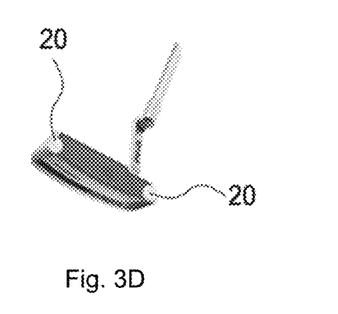

FIG. 1 is a block diagram showing the configuration of a system for analyzing a putting motion according to the present invention.

Referring to FIG. 1, the system according to the embodiment includes mat markers 10 for detecting positions and sizes of a mat, putter markers 20 attached to a putter held by a user's hand, and a golf ball 30.

In addition, the system further includes a camera 50 for photographing the markers, a mat detection unit 100 for detecting a position of the mat by using an image photographed by the camera 50, an object detection unit 110 for detecting physical position information of the ball and the putter in real time, a ball calculation unit 120 for calculating a speed and a direction of the ball, and a pointer calculation unit 130 for converting a moving direction of the putter into movement coordinates of the simulator pointer.

In the embodiment of the present invention, the markers having preset shape are arranged in a specific form on the putting mat, the markers are detected through the inputted image, and arrangement information of actual markers on the mat is matched with information obtained from the image, so that the installed distance, height, and angle between the camera 50 and the putting mat may be extracted.

In addition, horizontal and vertical coordinates of the image photographed by the camera 50 may be converted into actual physical positions on the mat by the mat detection unit 100 and the object detection unit 110, and the detected position information is analyzed after detecting the ball and the putter through the above procedure, so that a distance and a route physically moved may be extracted. The information about the extracted distance and route is used for the operation, such as menu selection, of the simulator, after the speed and the direction of the ball are calculated by the ball calculation unit 120 and converted into pointer coordinates by the pointer calculation unit 130.

Because the mat has a color contrasting with colors of the ball, the mat marker and the putter marker, and the size and the position of the mat are determined based on the mat markers, the camera is required to perform a re-detection operation when the mat is moved.

In addition, as for a menu selection function necessary for operating the simulator, the position movement information of the putter is used as input information of a pointing device by the pointer calculation unit 130. According to the above technical configuration, the operation may not be affected by the distance and the position between the camera and the putting mat, and installation information may be re-detected and re-calculated in real time even when the position of the mat changes during the operation of the simulator FIGS. 2A-2D are a view showing examples of arranging mat markers on a mat according to an embodiment of the present invention.

As shown in the drawing, the mat markers 10 may be variously arranged on the mat, in which the mat markers 10 have a color distinguished from the color of the mat, and the mat detection unit 100 detects the mat and the mat markers 10 in the image inputted from the camera 50 and calculates the installed position, distance, and angle of the mat. The mat marker 10 may have a circular, polygonal, or another shape, and the arrangement position of the mat markers 10 may include a straight line, a polygon, or at least two polygons.

First, the physical coordinate conversion of coordinates obtained from the image of the camera 50 will be described according to an embodiment of the present invention.

The image obtained from the camera 50 is projected onto a two-dimensional image plane with points in a three-dimensional space, in which the relationship in a pinhole camera may be expressed by following Expression (1).

$$s \begin{bmatrix} u \\ v \\ 1 \end{bmatrix} = \begin{bmatrix} fx & 0 & cx \\ 0 & fy & cy \\ 0 & 0 & 1 \end{bmatrix} \begin{bmatrix} r11 & r12 & r13 & t1 \\ r21 & r22 & r23 & t2 \\ r31 & r32 & r33 & t3 \end{bmatrix} \begin{bmatrix} X \\ Y \\ Z \\ 1 \end{bmatrix} \quad \text{[Expression 1]}$$

In addition, it can be expressed as sm=A[R|t]M.

In the above Expression (1), X, Y and Z are three-dimensional coordinates on the world coordinate system, and [R|t] is a rotation/movement transformation matrix for transforming the world coordinate system into a camera coordinate system.

In addition, fx and fy signify focal lengths, cx and cy signify principal points, and u and v signify the projected image coordinates.

In addition, A is an internal parameter of the camera, and [R|t] is an external parameter of the camera, in which the internal and external parameters of the camera are obtained through a camera calibration process.

Once the coordinates (u, v) projected to the image are known, various coordinates may be outputted by calculating three-dimensional space coordinates (X, Y, Z) corresponding to the projected coordinates by using the above Expression.

However, when only a Z value as a height factor is known, X and Y in the three-dimension may be obtained.

Subject to $$\begin{aligned} c1 &= r13^*Z + t1 \\ c2 &= r23^*Z + t2 \quad \text{and} \quad B = \begin{bmatrix} r11 & r12 & c1 \\ r21 & r22 & c2 \\ r31 & r32 & c3 \end{bmatrix}, \\ c3 &= r33^*Z + t3 \end{aligned}$$

the above Expression (1) is expressed as following Expression (2).

$$s \begin{bmatrix} u \\ v \\ 1 \end{bmatrix} = \begin{bmatrix} fx & 0 & cx \\ 0 & fy & cy \\ 0 & 0 & 1 \end{bmatrix} \begin{bmatrix} r11 & r12 & c1 \\ r21 & r22 & c2 \\ r31 & r32 & c3 \end{bmatrix} \begin{bmatrix} Y \\ Z \\ 1 \end{bmatrix} \quad \text{[Expression 2]}$$

The above Expression (2) is summarized as following Expression (3).

$$\begin{bmatrix} X \\ Y \\ 1 \end{bmatrix} = sA - 1B - 1 \begin{bmatrix} u \\ v \\ 1 \end{bmatrix} \quad \text{[Expression 3]}$$

In the putting mat, the ball moves in a plane with Z=0, the putter has a motion in proportion to the height of a person, and the Z value moves closest to zero at the moment when the ball impacts on the putter. Since three-dimensional coordinates of an object projected to a two-dimensional plane are obtained through the above condition, the three-dimensional coordinates X and Y for implementing the putter simulator may be obtained through the two-dimensional coordinates (u, v) obtained from the camera sensor by using the above Expressions.

As with the various examples shown in FIGS. 2A-2D, the process of extracting the installed position of the camera 50 and the mat through the detection of the mat markers will be described.

A plurality of mat markers 10 having a color in contrast to the putting mat are attached to the mat to have a straight or polygonal form, wherein a physical distance between the mat markers is constant at a specific length.

The mat and the mat markers provided in the mat may be found by using color contrast between the mat and the mat markers in the image obtained through the camera 50, and positions of the mat markers detected in the image, and the distance and inclination between the mat markers may be extracted.

When information on the mat markers obtained from the image is compared with information on the mat markers arranged in the actual mat, a distance of the mat from the camera 50, a height at which the camera 50 is installed, and even an inclined angle of the mat from the view of the camera may be obtained.

When there are a plurality of coordinates on a three-dimensional space and two-dimensional coordinate pairs on an image corresponding to the coordinates on the three-dimensional space, the external parameters of the camera may be obtained. Because the distance and the arranged interval between the mat markers arranged on the mat are predefined, the three-dimensional coordinates may be known, the positions of the markers on the image may be known by detecting the markers, and thus the external parameter of the camera may be obtained.

When the external parameters of the camera are defined as $$R = \begin{bmatrix} r11 & r12 & c1 \\ r21 & r22 & c2 \\ r31 & r32 & c3 \end{bmatrix}, t = \begin{bmatrix} t1 \\ t2 \\ t3 \end{bmatrix}$$

the position of the camera may be obtained by following Expression (4).

$$CameraPos = \begin{bmatrix} Cx \\ Cy \\ Cz \end{bmatrix} = R - 1t \qquad \text{[Expression 4]}$$

Cz: Height between the camera and the mat sqrt(Cx*Cx+Cy*Cy+Cz*Cz): Distance between the camera and the mat tan(Cy/Cx): Horizontal angle between the camera and the mat tan(Cz/sqrt(Cx*Cx+Cy*Cy)): Vertical angle between the camera and the mat Meanwhile, FIGS. 3A-3D show various cases of attaching the putter marker to the putter according to the embodiment. Since the ball uses a normalized standard size such as 43 mm, the putter marker is required to have a size distinguished from the ball, and the position of the putter may be identified in the same way as the ball detection. The ball detection will be described in detail as follows.

Figure 4A:
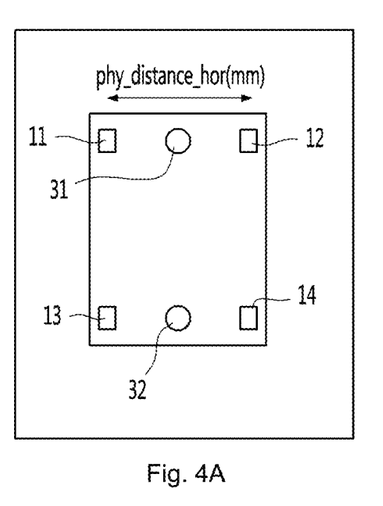
FIGS. 4A and 4B are schemes for detecting a ball according to an embodiment of the present invention.
Figure 4B:
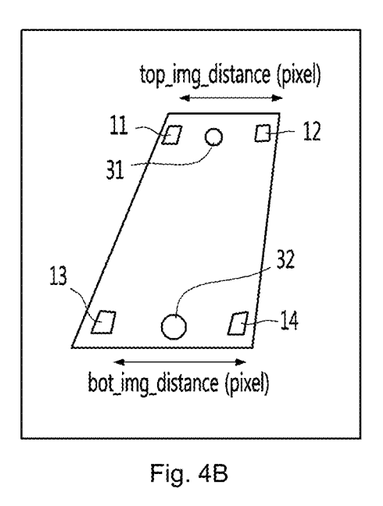

FIG. 4 is a view explaining a scheme for detecting a ball according to an embodiment of the present invention.

After the average brightness and the average color, which are detected through confirmation of the balls 31 and 32, of the mat are obtained in the mat, all object contrasting with the obtained brightness and color are detected.

The physical distance between the markers has a proportional relationship with the distance between the markers in the image. The size of the detected object may be known through the proportional relationship. Because the golf ball has a normalized size, such as 43 mm, the object corresponding to the size may be distinguished as a ball.

In FIGS. 4A and 4B, when physical arrangement distances between a first mat marker 11 and a second mat marker 12, and between a third mat marker 13 and a fourth mat marker 4 in the horizontal direction are the same, which are defined as phy_distance_hor (unit: mm); a pixel distance between the first mat marker 11 and the second mat marker 12 obtained from the camera image are defined as top_img_distance (unit: pixel. Hereinafter, a unit for the physical distance is mm, and a unit for the distance in the image is pixel); and a pixel distance between the third mat marker 13 and the fourth mat marker 14 is defined as bot_img_distance, the size of the ball (top_ball_size) placed on a line between the first mat marker 11 and the second mat marker 12 may be obtained by following Expression (5).

$$\text{top\_ball\_size} = (43 * \text{top\_img\_distance})/\text{phy\_distance\_hor} \qquad \text{[Expression 5]}$$

top_ball_size: Pixel size of the ball at top markers in the image (Size of the ball between the first mat marker and the second mat marker in the image)

top_img_distance: Pixel interval of the top markers 1 and 2 in the image (Distance between the first mat marker and the second mat marker in the image)

phy_distance_hor: Physical distance between markers 1 and 2, and between markers 3 and 4 (unit: mm. Physical distance between the first mat marker and the second mat marker, and between the third mat marker and the fourth mat marker)

In addition, the size of the ball (bot_bal_size) placed on a line between the third mat marker 13 and the fourth mat marker 14 may be obtained by following Expression (6).

$$\text{bot\_ball\_size} = (43 * \text{bot\_img\_distance})/\text{phy\_distance\_hor}, \qquad \text{[Expression 6]}$$

bot_ball_size: Pixel size of the ball at bottom markers in the image bot_img_distance: Pixel interval of the bottom markers 3 and 4 in the image phy_distance_hor: Physical distance between markers 1 and 2, and between markers 3 and 4 (unit: mm)

Because the size of the ball on the horizontal line in the image is the same, the sizes of the marker and the ball inside and outside the marker (detect_ball_size) may be obtained by using the difference between the sizes of top_img_distance and bot_img_distance in the obtained camera image, the pixel position of the top markers (top_mark_pos) and the position of the vertical pixel of the bottom marker (bot_mark_pos), and the vertical position (detect_ball_pos) of the detected ball in the image, as shown Expression (7).

$$\text{diff\_tb\_pixel} = (\text{bot\_mark\_pos} - \text{top\_mark\_pos});$$

$$\text{diff\_top\_dist} = (\text{detect\_ball\_pos} - \text{top\_mark\_pos});$$

$$\text{diff\_bot\_dist} = (\text{bot\_mark\_pos} - \text{detect\_ball\_pos});$$

$$\text{detect\_ball\_size} = ((\text{top\_ball\_size} * \text{diff\_bot\_dist}) + (\text{bot\_ball\_size} * \text{diff\_top\_dist}))/\text{diff\_tb\_pixel} \qquad \text{[Expression 7]}$$

diff_tb_pixel: Pixel interval of the top and bottom markers in the image diff_top_dist: Pixel interval between the ball and the top marker in the image diff_bot_dist: Pixel interval between the ball and the bottom marker in the image bot_mark_pos: Vertical pixel position of the bottom marker top_mark_pos: Vertical pixel position of the top marker detect_ball_pos: Vertical pixel position of the ball in the image detect_ball_size: Size of the detected ball Finally, the detection of the moving directions and the speeds of the ball and the putter will be described.

The moving speeds of the ball and the putter and the moving direction of the putter may be obtained through the three-dimensional coordinate system obtained by applying the above-description herein.

Figure 5:
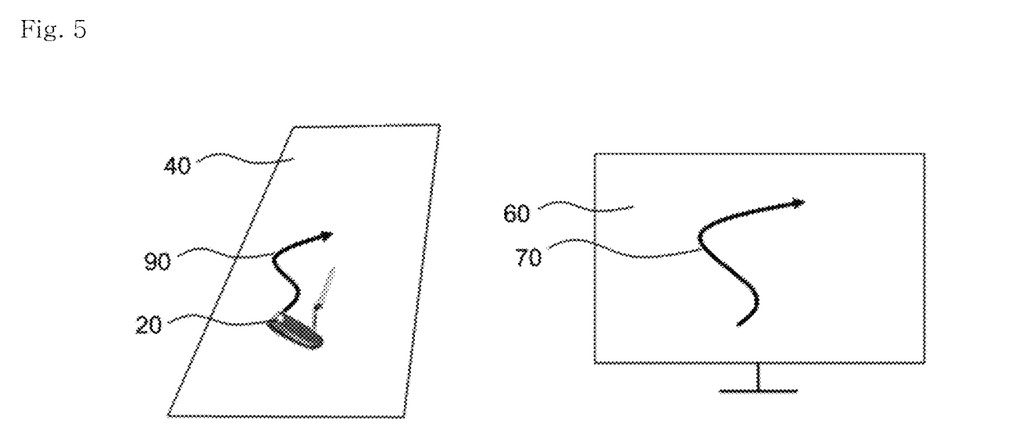
FIG. 5 is a view explaining a scheme for using detected putter coordinates as pointer coordinates for selecting a menu of a simulator according to an embodiment of the present invention.

The moving speed of the object may be obtained by following Expression (8).

$$\text{object\_distance} = \text{sqrt}((\text{previous\_ypos} - \text{current\_ypos})^2 + (\text{previous\_xpos} - \text{current\_xpos})^2) \text{ object\_speed} = (\text{object\_distance} * \text{frame\_rate})/1000 \qquad \text{[Expression 8]}$$

object_distance: Moving distance of the object previous_ypos: Three-dimensional Y coordinate of the object in the immediately previous image previous_xpos: Three-dimensional X coordinate of the object in the immediately previous image current_ypos: Three-dimensional Y coordinate of the object in the current image current_xpos: Three-dimensional X coordinate of the object in the current image frame_rate: Frame rate of the camera sensor object_speed: Moving speed of the object The moving direction of the object becomes a difference value between the previous frame and the current frame of the X and Y direction components on the three-dimensional plane, and may be expressed by following Expression (9).

$$\text{move\_slope} = (\text{current\_ypos} - \text{previous\_ypos})/(\text{current\_xpos} - \text{previous\_xpos}) \text{ move\_angle} = \text{atan}(\text{move\_slope}) * 180/n \qquad \text{[Expression 9]}$$

previous_ypos: Three-dimensional Y coordinate of the object in the immediately previous image previous_xpos: Three-dimensional X coordinate of the object in the immediately previous image current_ypos: Three-dimensional Y coordinate of the object in the current image current_xpos: Three-dimensional X coordinate of the object in the current image move_slope: Moving slope of the object move_angle: Moving angle of the object FIG. 5 is a view showing that the coordinates of the detected putter are used after converted into pointer coordinates for menu selection necessary for operating the simulator according to an embodiment of the present invention.

According to the embodiment, when the marker 20 is attached to the putter and the putter moves within the mat 40, movement position information 90 of the putter in the mat may be converted into a physical position movement 70 by using Expressions (1), (2) and (3), and the converted physical position may be displayed on a display device 60 by using the converted physical position as an input of the pointing device. Accordingly, a user interface such as menu selection may be implemented and the simulator operation may be facilitated regardless of installed positions of the camera and the mat.

Figure 6:
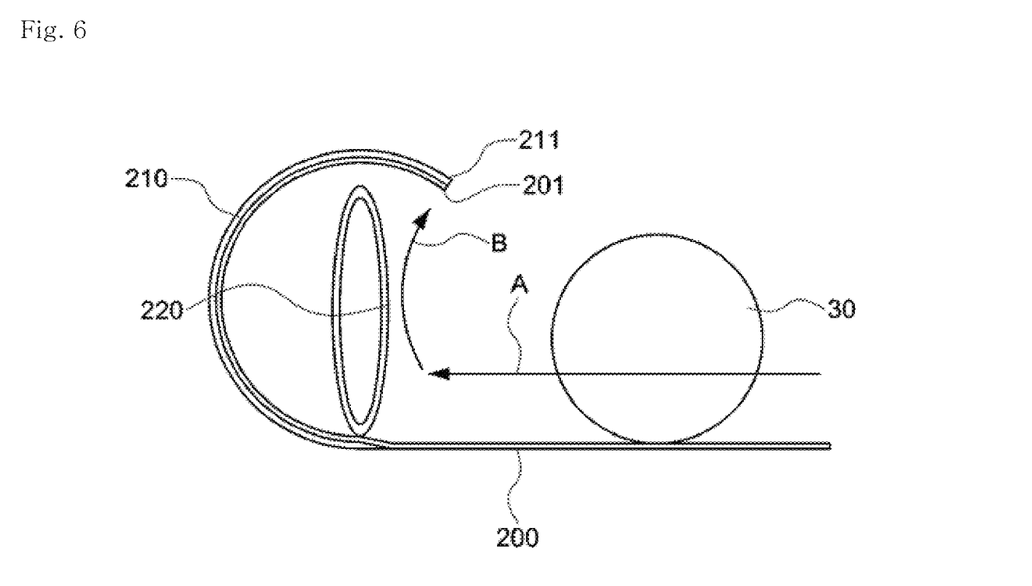
FIG. 6 a view showing the configuration of a ball stopper for restricting a movement of a ball according to an embodiment of the present invention.

Meanwhile, FIG. 6 is a view showing the configuration of a ball stopper according to a first embodiment of the present invention.

According to the embodiment, in the case where the putting is performed on the mat to which the mat markers 10 are attached, concentration of a putting practice may be decreased when the putted ball returns to the original position. Accordingly, in the embodiment, a ball stopper is provided to allow the ball putted by the user from the first position to stay at the second position.

Because most putting practices are performed indoors, it is also important to prevent noise from being generated when the ball stopper restricts or interrupts a movement of the ball.

The ball stopper 210 of the embodiment is provided on a route through which the putted ball 30 passes, the ball 30 passes over the mat 200, and the ball stopper 210 has a shape for accommodating an end of the mat 200.

More specifically, the ball stopper 210 has a "C"-like shape having a closed upper end 211, in which the stopper has a circle-like shape which is partially incised to be open or an upper end closed shape, and an end of the mat 200 comes into closely contact with the ball stopper 210 along an inner circumferential surface of the ball stopper 210.

Particularly, an upper end 211 of the ball stopper 210 is bent toward the mat 200, and an end 201 of the mat 200 coming into close contact along the inner circumferential surface of the ball stopper 210 is also bent together with the upper end 211 of the ball stopper 210.

In addition, the ball stopper 210 includes a barrier 220 for lowering the speed of the moving ball 30, in which the putted ball 30 is remarkably decelerated when bumped against the barrier 220, which is formed of a material having a predetermined elasticity, in the process of approaching into the ball stopper 210, and collides with a downwardly bent portion of the upper end 211 of the ball stopper 210 again due to inertia. In other words, the putted ball 30 moves in the A direction, moves in the B direction after hitting the barrier 220, and collides with the upper end 211 of the ball stopper, thereby reducing the speed again.

The barrier 220 and the end 201 of the mat 200 are formed of a material, such as rubber and silicon, having a predetermined elasticity for preventing a large noise upon contact with the ball 30, and the above structure may reduce cases in which the putted ball 30 returns to the start position again.

Figure 7:
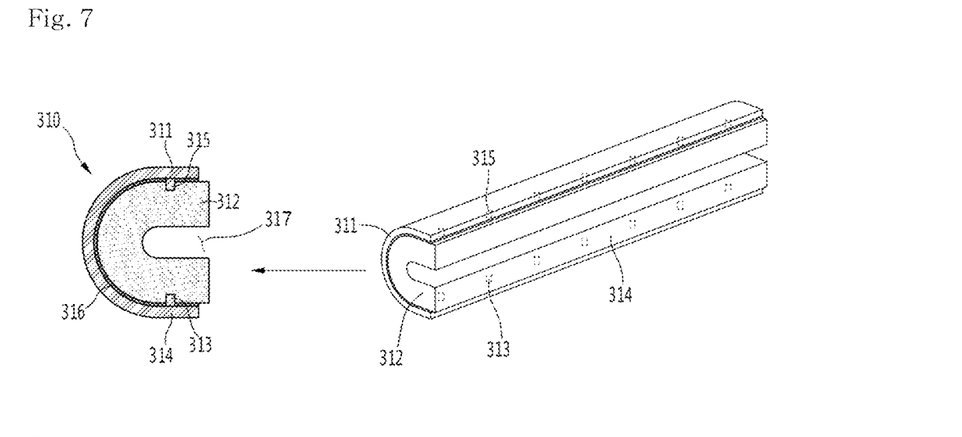
FIG. 7 is a perspective view and a sectional view of the ball stopper according to a second embodiment of the present invention.

FIG. 7 is a perspective view and a sectional view of the ball stopper according to a second embodiment of the present invention.

Referring to FIG. 7, the ball stopper according to the second embodiment includes an outer cover 311 having a predetermined space therein and opened at one side thereof, and a filling member 312 fixed in contact with an inner surface of the outer cover 311 and partially exposed through the outer cover 311.

A part of the filling member 312 protrudes from the outer cover 311. The outer cover 311 may have a semi-cylindrical shape in which a cylinder having a predetermined length is cut in half along the longitudinal direction.

Referring to a side section of the outer cover 311, the outer cover has a 'C' shape in which one side is open and the other side is blocked.

The filling member 312 may be attached to fill the inner surface of the outer cover 311, and may protrude from the outer cover 311 by a predetermined length, so that the golf ball comes into first contact with the filling member 312.

A through-groove 317 may be formed in the surface of the filling member 312, which is exposed by the outer cover 311, to have a predetermined depth.

The through-groove 317 may have a height corresponding to a radius (½ of a diameter) of the golf ball, and the through-groove 317 is arranged to be positioned at a center of the golf ball to be hit.

The filling member 312 may be formed of a low elastic material to reduce repulsive force due to an impact of the golf ball, and preferably, may be formed of memory foam or latex.

A PVC film 316 may be disposed between the outer cover 311 and the filling member 312. The PVC film 316 may be provided to improve adhesion between the outer cover 311 and the filling member 312 and serve to allow the outer cover 311 to be more tightly coupled to the filling member 312 when the ball stopper is assembled, and maintain the adhesion state for a longer time.

A plurality of first connection portions 313 having a predetermined diameter and length and protruding upward may be provided on a lower surface portion 314 of the outer cover 311 along the extension direction of the outer cover 311. The first connection portions 313 are fastened to the mat overlapped with an upper part of the lower surface portion 314, and connected to a lower surface of the filling member 312 disposed inside the outer cover 311 while simultaneously connecting the outer cover 311 to the mat, thereby serving to fix the filling member 312.

In addition, a plurality of second connection portions 315 having a predetermined diameter and length and protruding downward may be provided on an upper surface portion of the outer cover 311 along the extension direction of the outer cover 311.

The second connection portions 315 are connected to an upper surface of the filling member 312 disposed inside the outer cover 311, so that the filling member 312 may be fixed.

Figure 8:
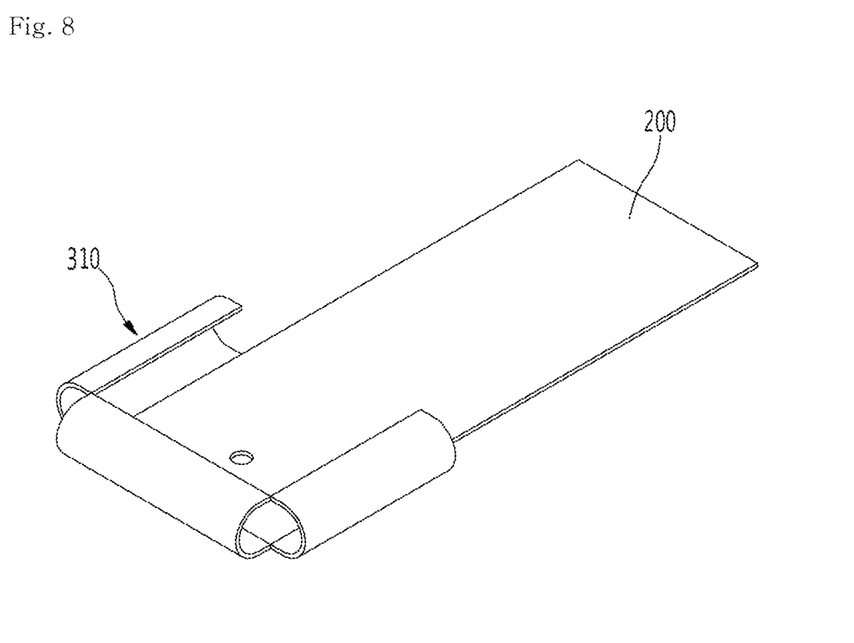
FIG. 8 is a perspective view showing the ball stopper coupled to the putting mat according to the embodiment of the present invention.

FIG. 8 is a perspective view showing the ball stopper coupled to the putting mat according to the embodiment of the present invention. Referring to FIG. 8, the ball stopper 310 according to an embodiment may be arranged along a corner of the putting mat 200. Since most golf balls are putted toward a hole cup, the ball stopper 310 may be arranged near the hole cup which the golf ball mainly reaches.

Figure 9:
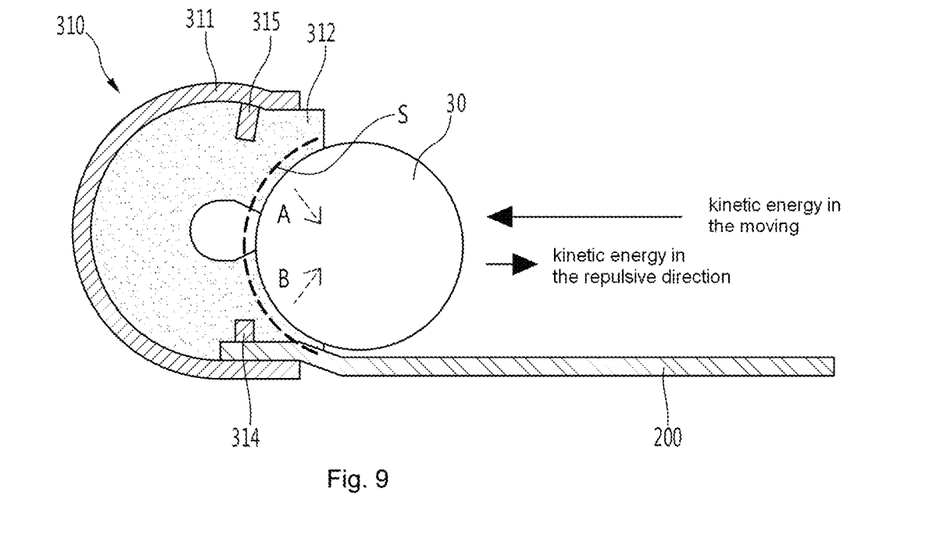
FIG. 9 is a view showing repulsive force of the golf ball due to the ball stopper according to a second embodiment of the present invention.

FIG. 9 is a view showing repulsive force of the golf ball due to the ball stopper according to a second embodiment of the present invention. FIG. 9 shows the moment that the putted golf ball comes into contact with the ball stopper 310 when the ball stopper 310 is installed on a side corner of the putting mat 200.

When the putted golf ball moves with kinetic energy and collides with the filling member 312 provided on the ball stopper 310, the surface of the filling member 312 is deformed inward at a predetermined degree due to the kinetic energy of the golf ball. Herein, since the surface of the filling member 312 is formed at a center thereof with the through-groove 317 having a predetermined size, a part of the golf ball enters inside the through-groove 317 when the golf ball collides with the filling member 312.

The contact region between the golf ball and the filling member 312 may appear as S. Since the surface of the through-groove 317 is deformed to surround the surface of the golf ball, the through-groove 317 formed in the filling member 312 further widens a contact area between the golf ball and the filling member 312. Accordingly, the energy for the rectilinear motion of the golf ball and the energy for the rotational motion may be further dispersed by the filling member 312.

The repulsive force due to the deformation of the filling member 312 may be generated in the direction, such as A and B, perpendicular to the contact surface of the filling member 312, thereby having components canceling each other according to vector directions, so that the force size may be reduced.

Figure 10A:
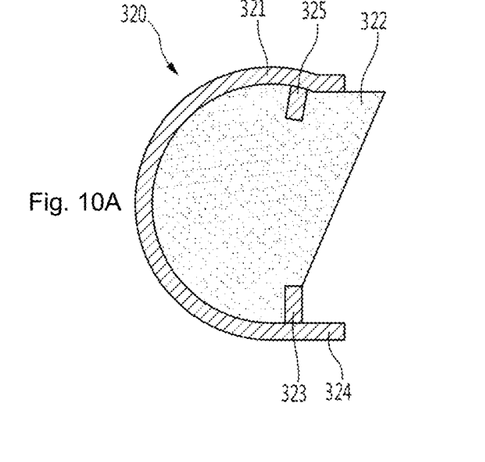
FIGS. 10A and 10B are a cross section view of the ball stopper and the repulsive force of the golf ball using the same according to a third embodiment of the present invention.
Figure 10B:
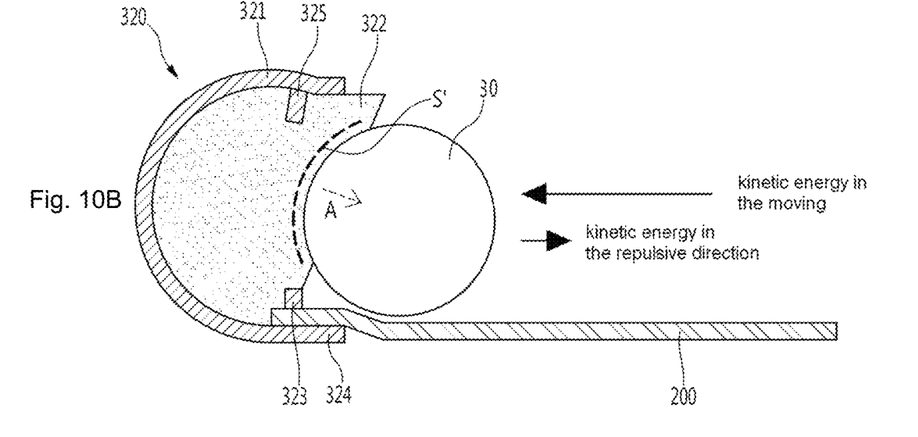

FIG. 10 is a view showing the cross section of the ball stopper and the repulsive force of the golf ball using the same according to a third embodiment of the present invention. Referring to FIGS. 10A and 10B, the ball stopper 320 according to the third embodiment has the same shapes of the outer cover and the mechanism for fixing the inside of the outer cover, as those of the second embodiment, and the shape of the filling member 322 has a difference therebetween, so a side sectional view showing the shape of the filling member 322 will be provided as a reference.

In the third embodiment, the filling member 322 is formed by partially cutting a circular column, which is filled in the region surrounded by the outer cover 321, in the forming direction.

Specifically, the surface of the filling member 322 protruding outward from the outer cover 321 may be formed to be inclined along the lower surface from the upper surface of the outer cover 320, and may be inclined by a predetermined angle in the inner direction of the outer cover 321 from the top to the bottom.

As shown in (b) of the drawing, when the golf ball maximally reaches and comes into contact inside the filling member 322, the contact region between the golf ball and the filling member 312 may appear as S'. In this case, since the golf ball comes into contact with the filling member 322 on a slope surface with respect to the moving direction, thereby enlarging the contact area, so that the repulsive kinetic energy significantly smaller than the kinetic energy in the moving direction may appear in the opposite direction.

Figure 11A:
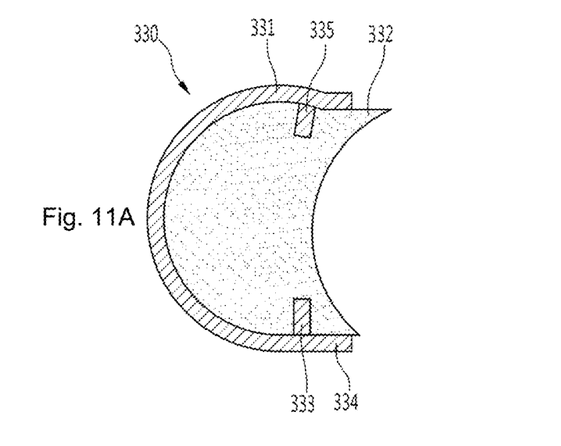
FIGS. 11A and 11B are a cross section view of the ball stopper and the repulsive force of the golf ball using the same according to a fourth embodiment of the present invention.
Figure 11B:
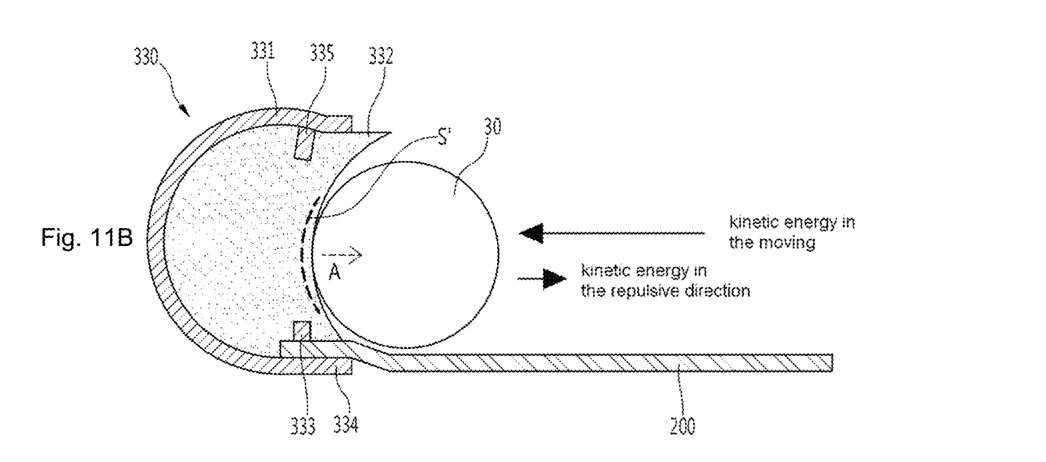

FIGS. 11A and 11B are views showing the cross section of the ball stopper and the repulsive force of the golf ball using the same according to a fourth embodiment of the present invention. Referring to FIGS. 11A and 11B, the ball stopper 320 according to the fourth embodiment has the same shapes of the outer cover and the mechanism for fixing the inside of the outer cover, as those of the first embodiment, and the shape of the filling member 322 has a difference therebetween.

In the fourth embodiment, the filling member 332 may be formed such that the surface exposed to the outside of the outer cover 331 has a groove of a predetermined depth from the top to the bottom.

For example, a groove may be formed such that the surface of the exposed filling member 332 is curved.

Through the above scheme, the moving direction and speed of the ball through the putter motion can be detected in real time, and the performance of the simulator can be improved.

What is claimed is:

1. A system for analyzing a putting motion, the system comprising:
   a plurality of mat markers attached to a mat, on which a ball is placed, at a fixed physical arrangement distance;
   a mat having a color contrasting with a color of the mat marker;
   a camera for photographing the mat markers; and
   a mat detection unit for detecting a position of the mat in real time from an image photographed by the camera, wherein
   the mat detection unit obtains three-dimensional coordinates of the mat markers based on positions of the mat markers photographed by the camera and predetermined gaps of the mat markers, extracts a distance, a height, and an installation angle between the mat and the camera through the three-dimensional coordinates obtained by the mat detection unit, and obtains physical coordinates of an object moving in the mat through the obtained three-dimensional coordinates of the mat markers.

2. The system of claim 1, further comprising:
   at least one putter marker attached to the putter and having a color contrasting with the color of the mat;
   an object detection unit for detecting a position of the putter in real time from an image of the putter marker photographed by the camera; and
   a pointer calculation unit for converting information detected by the object detection unit into a physical position to be used as an input of a pointing device.

3. The system of claim 1, further comprising:
   a ball having a color contrasting with the color of the mat;
   an object detection unit for detecting a position of the ball in real time from an image of the ball photographed by the camera; and
   a ball calculation unit for calculating a moving speed and a direction of the ball by using information detected by the object detection unit.

4. The system of claim 1, wherein the mat is provided at one side thereof with a ball stopper for restricting a movement of the ball, in which
   the ball stopper has a circle-like shape which is partially incised to be open,
   an upper end of the ball stopper has a shape bent toward the mat,
   an end of the mat is arranged to come into close contact with an inner surface of the ball stopper, and
   the ball stopper is provided therein with a barrier having a predetermined elasticity to come into contact with the ball.

5. The system of claim 1, wherein the mat is provided at one side thereof with a ball stopper for restricting a movement of the ball, in which the ball stopper includes an outer cover having a predetermined space therein and opened in a direction facing the mat, and a filling member fixed in contact with an inside of the outer cover and having a part partially exposed through the outer cover, and wherein the filling member protrudes from the outer cover at a predetermined portion of the filling member while filling the inside of the outer cover, the filling member is formed on an exposed surface thereof with a through-groove having a predetermined length and width, and the through-groove is configured to have a predetermined length and width to come into contact with a center of the ball moving along the mat.

6. The system of claim 5, wherein the outer cover is provided on a lower surface portion thereof with a plurality of first connection portions, which have a predetermined diameter and length and protrude upward, along an extending direction of the outer cover, in which the first connection portions are coupled to holes formed in the mat to connect the outer cover to the mat and fix the filling member provided inside the outer cover.

7. The system of claim 5, wherein a surface of the filling member exposed by the outer cover is inclined from an upper surface to a lower surface of the outer cover, and inclined by a predetermined angle in an inward direction of the outer cover from the upper surface to the lower surface of the outer cover.

\* \* \* \* \*